United States Patent
Mola et al.

(10) Patent No.: US 10,169,196 B2
(45) Date of Patent: Jan. 1, 2019

(54) ENABLING BREAKPOINTS ON ENTIRE DATA STRUCTURES

(71) Applicant: Microsoft Technology Licensing, LLC, Redmond, WA (US)

(72) Inventors: Jordi Mola, Bellevue, WA (US); William R. Messmer, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/463,424

(22) Filed: Mar. 20, 2017

(65) Prior Publication Data
US 2018/0267882 A1    Sep. 20, 2018

(51) Int. Cl.
*G06F 9/44*      (2018.01)
*G06F 11/36*     (2006.01)

(52) U.S. Cl.
CPC .................. *G06F 11/3624* (2013.01)

(58) Field of Classification Search
None
See application file for complete search history.

(56) References Cited

U.S. PATENT DOCUMENTS

| | | | |
|---|---|---|---|
| 5,535,318 A | 7/1996 | Motoyama et al. | |
| 6,106,572 A | 8/2000 | Halpern | |
| 6,182,208 B1 | 1/2001 | Peri et al. | |
| 6,237,135 B1 | 5/2001 | Timbol | |
| 6,240,545 B1 * | 5/2001 | Carmichael | G06F 11/362 714/E11.209 |
| 6,795,962 B1 | 9/2004 | Hanson | |
| 7,000,225 B2 * | 2/2006 | Sangavarapu | G06F 11/362 714/E11.21 |
| 7,694,278 B2 | 4/2010 | Pasumansky et al. | |
| 7,840,849 B2 | 11/2010 | O'Callahan | |
| 8,423,965 B2 | 4/2013 | Goel et al. | |
| 8,578,340 B1 | 11/2013 | Daudel et al. | |
| 8,656,359 B2 * | 2/2014 | Savov | G06F 11/3664 717/125 |
| 9,021,444 B2 | 4/2015 | Garrett et al. | |
| 9,032,374 B2 | 5/2015 | Munson et al. | |
| 2003/0061599 A1 * | 3/2003 | Bates | G06F 11/362 717/129 |

(Continued)

OTHER PUBLICATIONS

Haller, et al., "MemPick: High-Level Data Structure Detection in C/C++ Binaries", In Proceedings of 20th Working Conference on Reverse Engineering, Oct. 14, 2013, pp. 32-41.

(Continued)

*Primary Examiner* — Philip Wang
*Assistant Examiner* — Rongfa P Wang
(74) *Attorney, Agent, or Firm* — Workman Nydegger (57) ABSTRACT

Enabling breakpoints on entire data structures include methods, systems, and computer program products for setting breakpoints on a plurality of memory addresses covered by a data structure. One embodiment includes receiving a reference to a data structure for which breakpoints are requested and then, based on this reference, identifying a data structure layout of the data structure. Based on the data structure layout of the data structure, a plurality of memory addresses that are covered by the data structure are identified, and the plurality of memory addresses are added to a list of breakpoints.

20 Claims, 7 Drawing Sheets

(56) References Cited

U.S. PATENT DOCUMENTS

| | | |
|---|---|---|
| 2003/0106045 A1 | 6/2003 | Arnold et al. |
| 2004/0172623 A1 | 9/2004 | Eckels et al. |
| 2004/0225920 A1* | 11/2004 | Bates .................. G06F 11/362 714/38.13 |
| 2006/0101405 A1 | 5/2006 | Buschardt et al. |
| 2007/0168736 A1 | 7/2007 | Ottavi et al. |
| 2008/0196013 A1 | 8/2008 | Sim |
| 2009/0150870 A1 | 6/2009 | Bates |
| 2011/0072309 A1* | 3/2011 | Sakai .................. G06F 11/362 714/35 |
| 2011/0126176 A1* | 5/2011 | Kandasamy ........ G06F 11/3644 717/130 |
| 2011/0154111 A1* | 6/2011 | Beilmann ............. G06F 11/362 714/34 |
| 2012/0131309 A1* | 5/2012 | Johnson .................. G06F 9/30 712/41 |
| 2012/0291017 A1* | 11/2012 | Fuhrer .................. G06F 11/362 717/125 |
| 2015/0033211 A1* | 1/2015 | Bates .................. G06F 11/3636 717/129 |
| 2015/0121127 A1 | 4/2015 | Jain |
| 2015/0378870 A1 | 12/2015 | Marron et al. |
| 2016/0292061 A1 | 10/2016 | Marron et al. |
| 2017/0249230 A1* | 8/2017 | Tsirkin .................. G06F 11/362 |

OTHER PUBLICATIONS

Barr, et al., "Tardis: affordable time-travel debugging in managed runtimes", In Proceedings of the ACM International Conference on Object Oriented Programming Systems Languages & Applications, Oct. 20, 2014, 16 pages.

"Chronon Time Travelling Debugger", Retrieved From http://chrononsystems.com/products/chronon-time-travelling-debugger, Retrieved on: Nov. 24, 2016, 5 Pages.

Bhansali, et al., "Framework for instruction-level tracing and analysis of program executions", In Proceedings of the 2nd international conference on Virtual execution environments., Jun. 14, 2006, pp. 154-163.

Marron, et al., "Time-Travel Debugging for JavaScript/HTML Applications", Retrieved from https://channel9.msdn.com/blogs/Marron/Time-Travel-Debugging-for-JavaScriptHTML, May 13, 2015, 12 Pages.

Pandy, Laslo, "Elm's Time Traveling Debugger", Retrieved from http://web.archive.org/web/20140416213617/http:/debug.elm-lang.org/, Apr. 16, 2014, 6 Pages.

"International Search Report and Written Opinion Issued in PCT Application No. PCT/US17/068842", dated Jul. 3, 2018, 12 Pages.

"International Search Report and Written Opinion Issued in PCT Application No. PCT/US18/022084", dated Jun. 4, 2018, 13 Pages.

Phang, et al., "Expositor: scriptable time-travel debugging with I first-class traces", In Proceedings of the 2013 International Conference on Software Engineering, May 18, 2013, pp. 352-361.

* cited by examiner

ENABLING BREAKPOINTS ON ENTIRE DATA STRUCTURES

BACKGROUND

When writing code during the development of software applications, developers commonly spend a significant amount of time "debugging" the code to find runtime errors in the code. In doing so, developers may take several approaches to reproduce and locate a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging software applications ("debuggers") have been developed in order to assist developers with the code debugging process. These tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" and/or "watchpoints."

For most debuggers, a "breakpoint" triggers when a specified point in computer code (i.e., a specific code instruction) is reached, and a "watchpoint" triggers when the value of a specified data element has changed or is accessed. When a breakpoint or watchpoint triggers, the debugger suspends execution of the subject code, and presents program state at that point. To implement breakpoints/watchpoints, a debugger identifies a memory address associated with the item of interest (e.g., a memory address associated with a code instruction for breakpoints, or a memory address associated with a data element for watchpoints), and then watches for an access to that address. While breakpoints and watchpoints are distinct, for simplicity they are both referred to generally herein as breakpoints. Thus, as used herein, a "breakpoint" refers to any debugger functionality that causes a specific memory address to be watched for, and that suspends code execution based on detecting an access to a watched-for memory address.

When watching for memory accesses, debuggers may utilize breakpoint functionality provided by a processor architecture (e.g., special processor registers devoted to breakpoint functionality), and/or may instrument the code that is being executed such that each operation that accesses memory (e.g., a read or a write to memory storing data, or a read/fetch for execution from memory storing program code) is instrumented with additional code instructions that check whether or not the access would cause a breakpoint to be triggered.

As indicated above, debuggers enable breakpoints to be set on specific code instructions (e.g., often corresponding to function boundaries, flow control statements, variable assignments and instantiations, etc.), and/or on specified data elements themselves, such as language primitives (e.g., integers, booleans, characters, strings, references, etc.), composite data structures (e.g., arrays, records, unions, etc.), abstract data structures (e.g., containers, lists, trees, graphs, etc.), or other custom data structures such as instances of classes. When setting breakpoints on specified data elements, debuggers set the breakpoint on the base memory address of the subject data element. Thus, for example, a breakpoint on a linked list results in a breakpoint on the memory address of the head of the linked list, a breakpoint on an array results in a breakpoint on the memory address of the first element in the array, a breakpoint on an instance of a class results in a breakpoint on the memory address referencing the instance, etc.

BRIEF SUMMARY

At least some embodiments described herein expand breakpoint functionality so that the addition of a breakpoint on a data structure can add breakpoints to a plurality of memory addresses covered by the data structure (i.e., up to the entire data structure), rather than merely to the base memory address of the data structure. Thus, embodiments can enable a debugger to suspend code execution when any memory address associated with a data structure is accessed (read from and/or written to) during execution.

Breakpoints may be configured to trigger when an accessed memory address is associated with data stored in the data structure, and/or when the accessed memory address is associated with the physical memory layout of the data structure itself. This enables a debugger to suspend execution when data within the data structure changes (e.g., to break based on changes that are visible within a conceptual view of the data structure), and/or when the physical memory layout of the data structure changes (e.g., to break based on changes that are visible within a physical view of the data structure).

To the accomplishment of the foregoing, when a breakpoint on a data structure is requested, embodiments operate to identify not only the base memory address of the data structure, but also all memory addresses that are covered by the data structure. All (or a subset) of these memory addresses may then be added to a breakpoint list, so that breakpoints trigger when any of these memory addresses are accessed.

In some embodiments, a method for setting breakpoints on a plurality of memory addresses covered by a data structure comprises receiving a reference to a data structure for which breakpoints are requested and then, based on this reference, identifying a data structure layout of the data structure. The method also comprises, based on the data structure layout of the data structure, identifying a plurality of memory addresses that are covered by the data structure and adding the plurality of memory addresses to a list of breakpoints.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein expand breakpoint functionality so that the addition of a breakpoint on a data structure can add breakpoints to a plurality of memory addresses covered by the data structure (i.e., up to the entire data structure), rather than merely to the base memory address of the data structure. Thus, embodiments can enable a debugger to suspend code execution when any memory address associated with a data structure is accessed (read from and/or written to) during execution.

Breakpoints may be configured to trigger when an accessed memory address is associated with data stored in the data structure, and/or when the accessed memory address is associated with the physical memory layout of the data structure itself. This enables a debugger to suspend execution when data within the data structure changes (e.g., to break based on changes that are visible within a conceptual view of the data structure), and/or when the physical memory layout of the data structure changes (e.g., to break based on changes that are visible within a physical view of the data structure).

To the accomplishment of the foregoing, when a breakpoint on a data structure is requested, embodiments operate to identify not only the base memory address of the data structure, but also all memory addresses that are covered by the data structure. All (or a subset) of these memory addresses may then be added to a breakpoint list, so that breakpoints trigger when any of these memory addresses are accessed.

Figure 1:
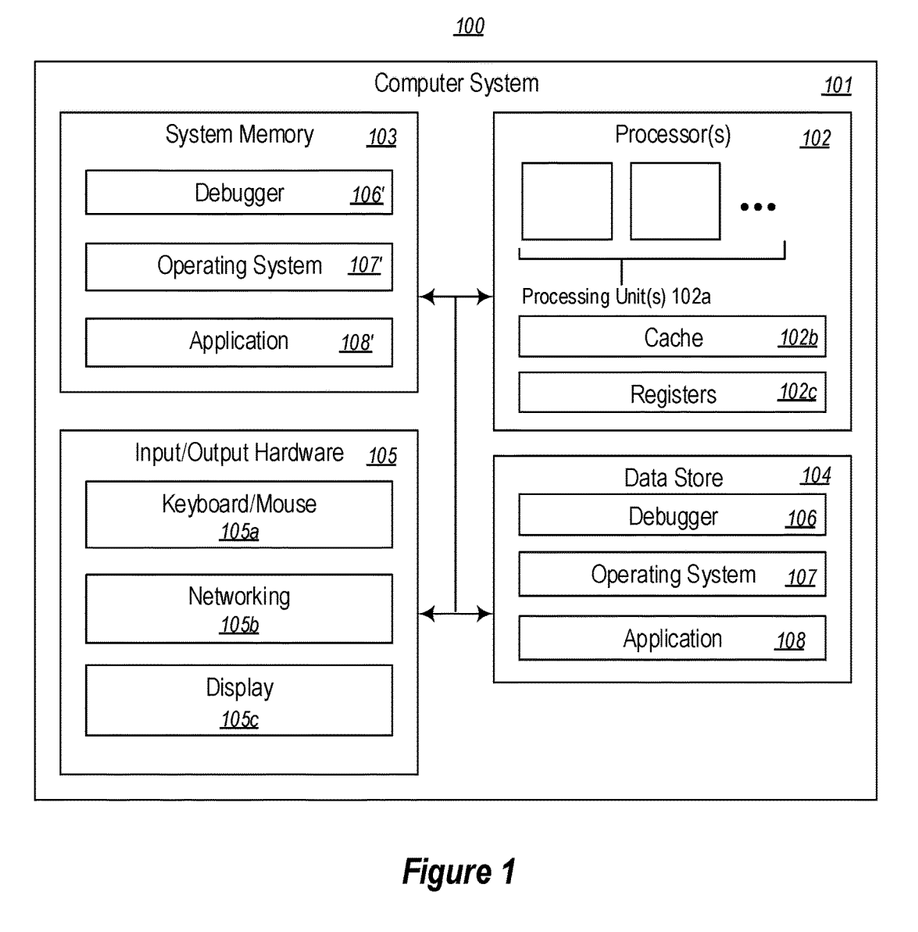
FIG. 1 illustrates an example computer architecture that facilitates enabling breakpoints on entire data structures.

FIG. 1 illustrates an example computing environment 100 that facilitates enabling breakpoints on entire data structures. As depicted, embodiments may comprise or utilize a special-purpose or general-purpose computer system 101 that includes computer hardware, such as, for example, one or more processors 102, system memory 103, one or more data stores 104, and/or input/output hardware 105 (e.g., such as the depicted keyboard/mouse hardware 105a, networking hardware 105b, and display device 105c). In some embodiment, computer system 101, and the components therein, could comprise a virtualized environment.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application code such as, for example, a debugger software application 106, an operating system 107, and any other software application 108. When application code is executing (e.g., using the processor(s) 102), the system memory 103 can store corresponding runtime data, such as runtime data structures, computer-executable instructions, etc. Thus, FIG. 1 illustrates the system memory 103 as including runtime debugger data 106', runtime operating system data 107', and runtime application data 108'.

FIG. 1 also includes a simplified representation of the internal hardware components of the processor(s) 102. As illustrated, each processor 102 includes a plurality of processing units 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more processing units 102a presented by that single physical processing unit.

Each processing unit 102a executes processor instructions that are defined by applications (e.g., code instruction of debugger 106, operating system 107, application 108, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102b, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code of application 108, the shared cache 102b stores a subset of the runtime application data 108' (e.g., variables, data structures, etc.) in a data cache section of the shared cache 102b. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

The debugger 106 enables execution of application code (e.g., code of application 108) to be tracked, modified, and visualized at a debugging user interface (e.g., a user interface presented at display 105c). For example, the debugger may cause code instructions of application 108 to be executed by the processor(s) 102, while observing program state during that execution, and enabling a user to set breakpoints, view and alter the observed program state, etc. In some embodiments, the debugger 106 may be a conventional debugger that relies only on the code of application 108 for debugging, or may, in some embodiments, be a "time travel" debugger that replays execution of the code of application 108 using data stored in a prior-recorded trace file that includes at least a portion of application state during a prior execution of the application, and that enables the debugger 104 to reproduce that prior execution.

Figure 2:
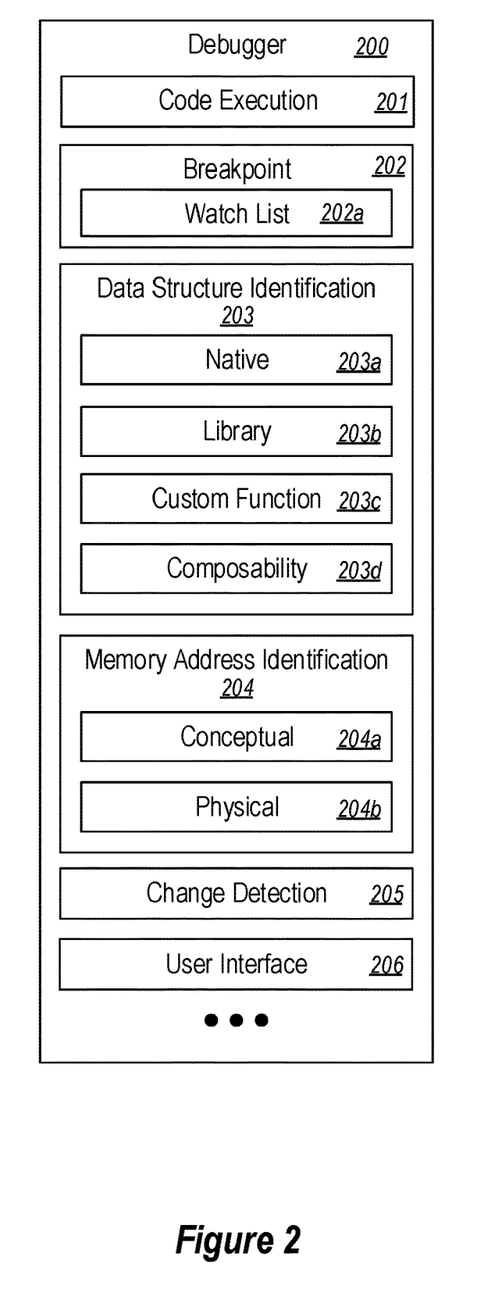
FIG. 2 illustrates example sub-components of an example debugger.

According to the embodiments herein, the debugger 106 enables breakpoints to be set on entire data structures, rather than on merely the base addresses or reference to a data structure. FIG. 2 illustrates a debugger 200, corresponding to debugger 106, and which includes a plurality of sub-components 201-206 for facilitating enabling breakpoints to be set on entire data structures.

As depicted, in one example the debugger 200 may include a code execution component 201, a breakpoint component 202, a data structure identification component 203, a memory address identification component 204, a change detection component 205, and/or a user interface component 206. The depicted identity and arrangement of sub-components 201-206 are merely one example as an aide in description, and one of ordinary skill in the art will recognize that the particular identity and number of sub-components of the indexing component 200 can vary greatly based on implementation (e.g., as indicated by the ellipses). In general, the code execution component 201 executes application code based on an instruction from the user interface 206. During the code execution, the breakpoint component 202 watches for breakpoints that are defined based upon user input at the user interface 206. These breakpoints can include breakpoints on up to an entire data structure, the layout of which is identified by the data structure identification component 203, and which layout is used by the memory address identification component 204 to identify memory addresses covered by the data structure. These components and concepts are now described in additional detail with frequent reference to data structures and memory layouts presented in FIGS. 3A-6B.

The code execution component 201 executes code of the application that is the subject of debugging (e.g., application 108) at the processor(s) 102. The code execution component 201 may execute the application code 108 naturally as a conventional debugger would, or may execute the application code as a "time travel" debugger by supplying the executing code with application state obtained from a trace file to reproduce a prior execution of the application code.

During execution of application code at the code execution component 201, the breakpoint component 202 uses a watch list 202a to watch for the triggering of breakpoints. In particular, the breakpoint component 202 watches for memory accesses (e.g., read or writes) to memory addresses that are listed in the watch list 202a. When a watched-for memory address is accessed, the breakpoint component 202 "triggers" the breakpoint by suspending code execution by the code execution component 201, and signaling the user interface component 206 to present a notice of the triggering.

It will be appreciated that enabling breakpoints on an entire data structure may involve using a watch list 202a storing a great number (e.g., many thousands or more) of memory addresses relative to the number of breakpoints a conventional debugger could typically watch for. This may lead to an inability to use hardware breakpoints, or to the use of instrumentation techniques that can significantly affect execution performance. To overcome these limitations, one example mechanism that facilitates watching for a large number of breakpoints is presented briefly in connection with FIG. 8.

Figure 3A:
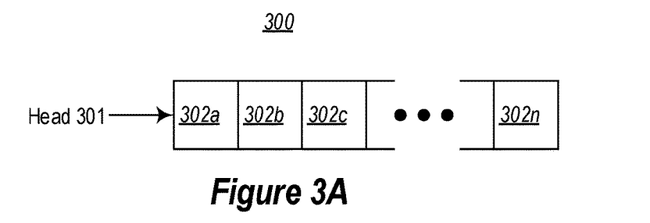
FIG. 3A illustrates an example array that includes a plurality of entries.
Figure 4A:
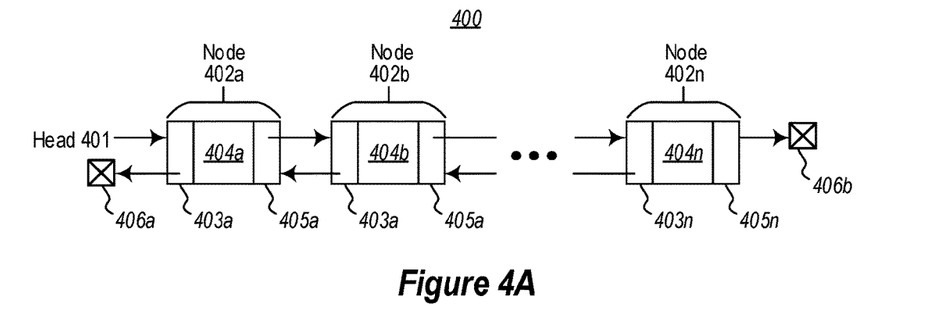
FIG. 4A illustrates an example linked list that includes a plurality of nodes.

The data structure identification component 203 receives a reference to a data structure for which breakpoints are desired. For example, based on user input at the user interface 206, the data structure identification component 203 receives a reference (e.g., name, memory address, etc.) of a data structure, potentially with any other information needed to understand the data structure. For example, FIG. 3A illustrates an example of an array 300 that includes a plurality of array entries (302a-302n, referred to generically as array entries 302). Receiving reference to the array may comprise receiving a reference (e.g., a memory address) to the head 301 (e.g. first entry) of the array 300. Receiving the reference to the array 300 may, as an example, be a result of a user-selection of the array 300 at the user interface component 206. As another example, FIG. 4A illustrates an example of a doubly linked list 400 that includes a plurality of nodes 402a-402n (referred to generically as nodes 402). Receiving reference to the linked list 400 may comprise receiving a reference (e.g., a memory address) to the head 401 (e.g. first node) of the linked list 400. Receiving the reference to the linked list 400 may, as an example, be a result of a user-selection of the linked list 400 at the user interface component 206.

Returning to FIG. 2, based on receiving a reference to a data structure, the data structure identification component 203 determines a type (and potentially other characteristics) of the data structure. The data structure component may identify the data structure type/characteristics based on a user-supplied hint at the user interface component 206, based on compiler data such as symbols, etc. For example, the data structure identification component 203 may determine that the array 300 is an array, or that the linked list 400 is a doubly linked list. The data structure identification component 203 may also determine other characteristics, such as a number of entries in the array 300 and/or linked list 400 and a data type of each entry (e.g., a primitive type, such as integer, boolean, character, reference, etc.; or another data structure type), based on a user-supplied hint at the user interface component 206, based on compiler data such as symbols, etc.

Based on the type of the data structure, the data structure identification component 203 determines how that type of data structure is laid out in memory. In order to do so, the data structure identification component 203 may leverage one or more sources of data structure layout information. As one example, the data structure identification component 203 may include a native component 203a that identifies data structure layout information based on data structures natively supported by the programming language corresponding to the program being debugged. For example, most modern programming languages natively support composite data structures (e.g., arrays, records, unions, etc.), and thus the layout of these structures is well defined by the programming language that is being used.

Accordingly, referring briefly again to FIG. 3A, to identify how array 300 is laid out in memory, the data structure identification component 203 may consult the native component 203a to determine how arrays are laid out in memory for the programming language that is being debugged. Thus, the data structure identification component 203 can identify the array structure as a plurality of entries (e.g., array entries 302) next to each other in memory, with the array reference (head 301) being the memory address of the first entry in the array. Based on the type of data stored in the entries, the data structure identification component 203 can also determine a size of each array entry 302.

Returning to FIG. 2, as another example, the data structure identification component 203 may include a library component 203b that identifies data structure layout information based on available code libraries. For example, the library component 203b may access programming language-specific libraries (e.g., the C++ Standard Template Library and the like) or other more general libraries or data structure description framework (e.g., Natvis from MICROSOFT CORPORATION and the like). These libraries typically define the layout of more abstract data structure types, such as containers, lists, trees, graphs, etc.

Accordingly, referring briefly again to FIG. 4A, to identify how linked list 400 is laid out in memory, the data structure identification component 203 may consult the library component 203b to determine how doubly linked lists are laid out in memory for the programming language that is being debugged. Thus, the data structure identification component 203 can identify the linked list structure as a plurality of nodes 402 that each includes (i) a "previous" pointer 403a-403n referencing the previous node, or referencing null 406a for the first node (the "previous" pointers 403a-403n are referred to generically as previous pointers 403); (ii) node entry data 404a-404n for each node (referred to generically as node entry data 404), and (iii) a "next" pointer 405a-405n referencing the next node, or referencing null 406b for the last node (the "next" pointers 405a-405n are referred to generically as next pointers 405). The data structure identification component 203 can identify the linked list structure with a reference (head 401) that is the memory address associated with the first node (402a). Based on the type of data stored in the entries, the data structure identification component 203 can also determine a size of the node entry data 404 for each node.

Returning to FIG. 2, as yet another example, the data structure identification component 203 may include a custom function component 203c that identifies data structure layout information based on a user-defined function. For example, the referenced data structure may be a non-standard user-defined data structure, and thus the user can supply a custom function that instructs the data structure identification component 203 on how to determine the layout of the custom data structure. For example, the custom function may include code that parses/traverses the data structure, and that enables the memory address identification component 204 to identify memory addresses covered by the data structure.

As depicted, the data structure identification component 203 may also include a composability component 203d. The composability component 203d enables the data structure identification component 203 to identify the layout of a data structure that includes other data structures (i.e., an "outer data structure" that includes one or more "inner data structures"). To this end, the composability component 203d identifies a type of the outer data structure and one or more type(s) of the inner data structures, and determines a data structure layout that includes all of them. For example, each array entry 302 of array 300 (an outer data structure, in this example), or the node entry data 404 of each node 402 in linked list 400 (again, an outer data structure in this example) may be an inner data structure (e.g., a different instance of a class) rather than a simple primitive. Thus, the composability component 203d can determine a type of these inner data structures and account for them when determining overall data structure layout that includes both the outer data structure and the inner data structures. In doing so, the data structure identification component 203 can identify the layout of each of the outer and inner data structures using one or more of the native component 203a (e.g., to identify the layout of the outer array 300), the library component 203b (e.g., to identify the layout of the outer linked list 400), or the custom function component 203c (e.g., to identify the layout of the inner class instances).

Figure 3B:
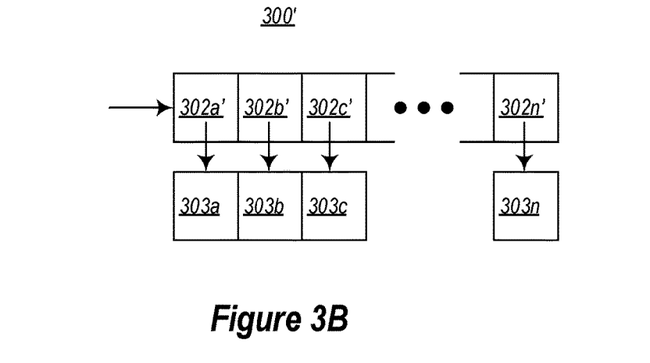
FIG. 3B illustrates an example array that stores references to data items.
Figure 4B:
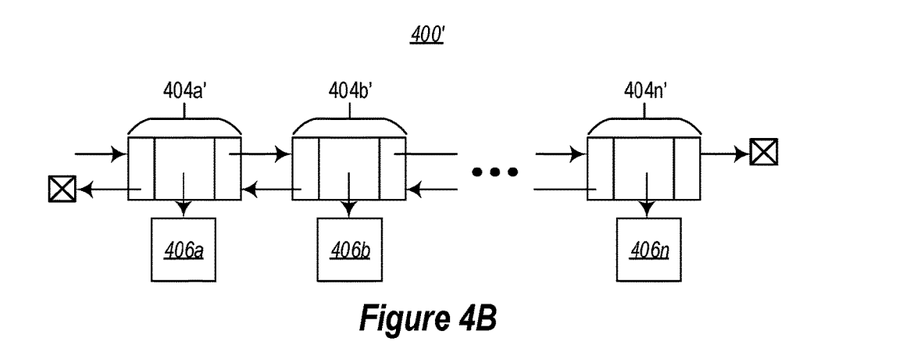
FIG. 4B illustrates an example linked list that stores references to data items.

In addition, the composability component 203d may compose outer data structures with inner data structures, even in situations in which the inner data structures are identified by reference, rather than being actual entries in the outer data structure. Examples of this are depicted in FIGS. 3B and 4B. FIG. 3B depicts an array 300' that corresponds to array 300 of FIG. 3A, but in which each array entry (302a'-302n', referred to generically as array entries 302') stores a reference (e.g., a primitive) to a memory address corresponding an inner data structure (303a-303n, referred to generically as inner data structures 303). Similarly, FIG. 4B depicts a linked list 400' that corresponds to linked list 400 of FIG. 4A, but in which each node's node entry data (404a'-404n', referred to generically as node entry data 404') stores a reference (e.g., a primitive) to a memory address corresponding to an inner data structure (406a-406n, referred to generically as inner data structures 406).

Thus, the composability component 203d can traverse these references to include layout of the inner data structures (e.g., inner data structures 303 for array 300', or inner data structures 406 for linked list 400') when determining the layout of the outer data structure. In some embodiments, the composability component 203d could traverse multiple levels of references (e.g., in situations in which the inner data structures 303/406, themselves, include references to other data structures, and so on). In these embodiments, the debugger 200 could include a configurable option to restrict the number of levels that are traversed.

Once a data structure layout of an identified data structure is determined by the data structure identification component 203 (including inner data structures, if any), the memory address identification component 204 uses this knowledge to identify memory addresses that are covered by the identified data structure. This may include traversing links between nodes of a data structure (e.g., for linked lists, trees, graphs, etc.), calculating a memory layout based on entry size and number (e.g., for arrays), and/or calling a custom function (e.g., that identifies how to navigate a data structure and/or that returns a list of memory addresses covered). The memory address identification component 204 stores these covered memory addresses in the watch list 202a for monitoring by the breakpoint component 202.

To illustrate the foregoing, FIGS. 5A-6B illustrate some example memory layouts 500/500'/600/600' corresponding, respectively, to the data structures 300/300'/400/400' of FIGS. 3A-4B. It will be appreciated that these memory layouts are for illustrative purposes only, and are non-limiting. For example, each depicted memory location could correspond to a single addressable memory location (e.g., a single byte) or to a range of addressable memory locations (e.g., multiple bytes). Additionally, each depicted memory location within the same example could correspond to different numbers of bytes. For example, while one depicted memory location may correspond to a number of memory addresses that cover an appropriate memory size to store a memory reference, another depicted memory location within the same example may correspond to a different number of memory addresses that cover an appropriate memory size to store an entire inner data structure that is far larger in size than a memory reference. Furthermore, while many memory locations in these examples may be depicted as being contiguous, this is for simplicity in illustration only, and for many data structures the covered memory locations may be (and in many cases probably are) non-contiguous.

Figure 5A:
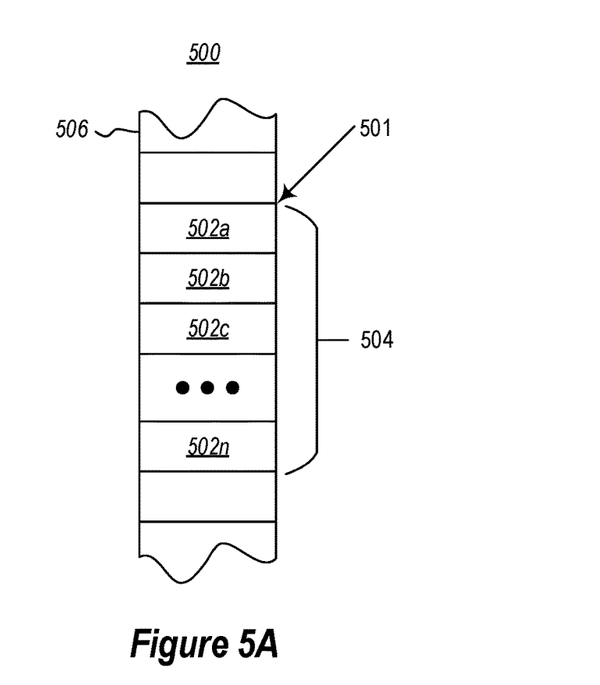
FIG. 5A illustrates an example memory layout corresponding to the array of FIG. 3A.

FIG. 5A illustrates an example memory layout 500 corresponding to the array 300 of FIG. 3A, and which layout may be identified by the memory address identification component 204 based on layout information determined by the data structure identification component 203. Memory layout 500 represents a memory portion 506, and identifies a range of memory addresses 504 within the memory portion 506 that includes memory locations 502a-502n (referred to generically as memory locations 502), each corresponding to a different array entry 302 of array 300. As such, each memory location 502 covers a sufficient number of memory addresses to store the data of its corresponding entry 302. These memory locations begin at an address 501 (i.e., the start of location 502) that corresponds to the reference head 301 of array 300.

The memory layout 500 of FIG. 5 may be calculated by the memory address identification component 204 based on knowledge of the head 301, based on knowledge of a size of each array entry 302, and based on knowledge of a number of entries in the array 300. After determining this memory layout 500, the memory address identification component 204 can store the identified range of memory addresses 504 in the watch list 202a, so that a breakpoint occurs whenever any of these locations are accessed. Note that since this is an array, it may be that the range of memory addresses 504 represents a contiguous chunk of memory, though this is not necessary. For example, a managed runtime may choose to store these memory ranges in a non-contiguous manner to facilitate caching, garbage collection, etc.

Figure 5B:
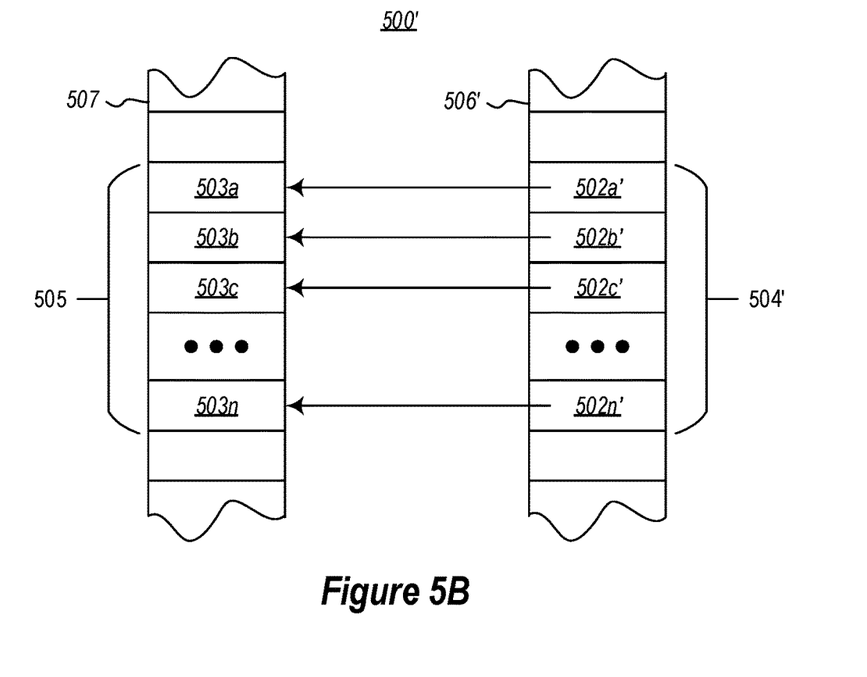
FIG. 5B illustrates an example memory layout corresponding to the array of FIG. 3B.

Similarly, FIG. 5B illustrates an example memory layout 500' corresponding to the array 300' of FIG. 3B. FIG. 5B illustrates two memory portions (506' and 507). Memory portion 506' corresponds generally to memory portion 506 in layout 500 of FIG. 5A, and it includes a first range of memory addresses 504' corresponding to memory locations 502' (i.e., locations 502a', 502b', and so on to 502c'), which, in turn each correspond one of the array entries 302' of array 300'. Each memory location 502' covers a sufficient number of memory addresses to store the data of its corresponding entry 302' (e.g., a reference primitive, in this example). The first range of memory addresses 504' generally represents an outer data structure (array) that contains references to inner data structures 303. The first range of memory addresses 504' could be determined, for example, based on knowledge of the head of the array, based knowledge of a size of each array entry 302' (e.g., a reference primitive), and based on knowledge of a number of entries in the array 300'.

Memory portion 505 contains memory locations (503a-503n, referred to generically as memory locations 503) that each store one of the inner data structures 303 of array 300'. Thus, as depicted, memory portion 505 includes a second range of memory addresses 505. After determining this memory layout 500', the memory address identification component 204 can store the identified ranges of memory addresses (504' and 505) in the watch list 202a, so that a breakpoint occurs whenever any of these locations are accessed. Note that since the first range of memory addresses 504' represent an array, as discussed above, it may be that the range of memory addresses 504' correspond to a contiguous chunk of memory (though this is not necessary). However, it may be that memory corresponding to the second range of memory addresses 505 is not contiguous. For example, there could be gaps in memory locations 503 storing two different inner data structures 303, or there could even be gaps in memory location storing individual data structures 303 (depending on their structure).

Figure 6A:
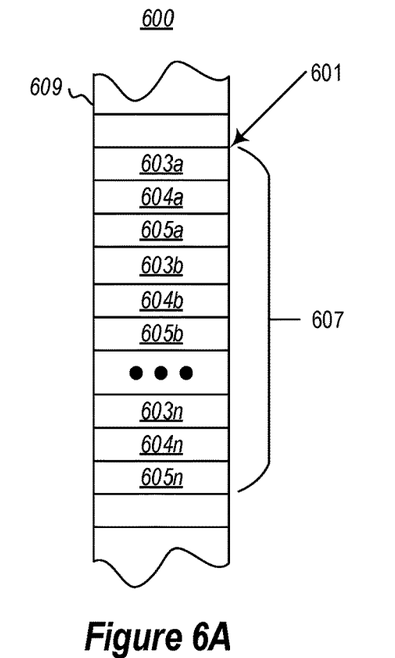
FIG. 6A illustrates an example memory layout corresponding to the linked list of FIG. 4A.

As another example, FIG. 6A illustrates an example memory layout 600 corresponding to the linked list 400 of FIG. 4A, and which layout may be identified by the memory address identification component 204 based on layout information determined by the data structure identification component 203. Memory layout 600 represents of a memory portion 609, and identifies a range of memory addresses 607 that includes memory locations 603a-603n, 604a-604n, and 605a-605n (referred to generically as memory locations 603, 604, and 605, respectively). This range of memory addresses 607 corresponds to the nodes 402 of the linked list 400 (i.e., memory locations 603a, 604a, and 605a for node 402a; memory locations 603b, 604b, and 605b for node 402b; and memory locations 603c, 604c, and 605c for node 402c). These memory locations begin at an address 601 (location 603a) that corresponds to the reference head 401 for linked list 400. Each memory location 603, 604, and 605 covers a sufficient number of memory addresses to store the data of its corresponding part of a node 402. For example, each of memory locations 603 and 605 covers a sufficient number of memory addresses to store a reference, and each of memory locations 604 covers a sufficient number of memory addresses to store node entry data 404. Again, these memory locations could be contiguous, but may also include some non-contiguous portions.

Memory layout 600 may be calculated by the memory address identification component 204 based on knowledge of the head 401 of the linked list 400, based on knowledge of a size of the node entry data 404, and based on knowledge of the structure of each node (i.e., a link to the previous node 403, node data 404, and a link to the next node 405). Thus, the memory address identification component 204 can traverse the links of the linked list 400 to identify each covered memory location. After determining this memory layout 600, the memory address identification component 204 can store the identified range of memory addresses 607 in the watch list 202a, so that a breakpoint occurs whenever any of these locations are accessed.

Figure 6B:
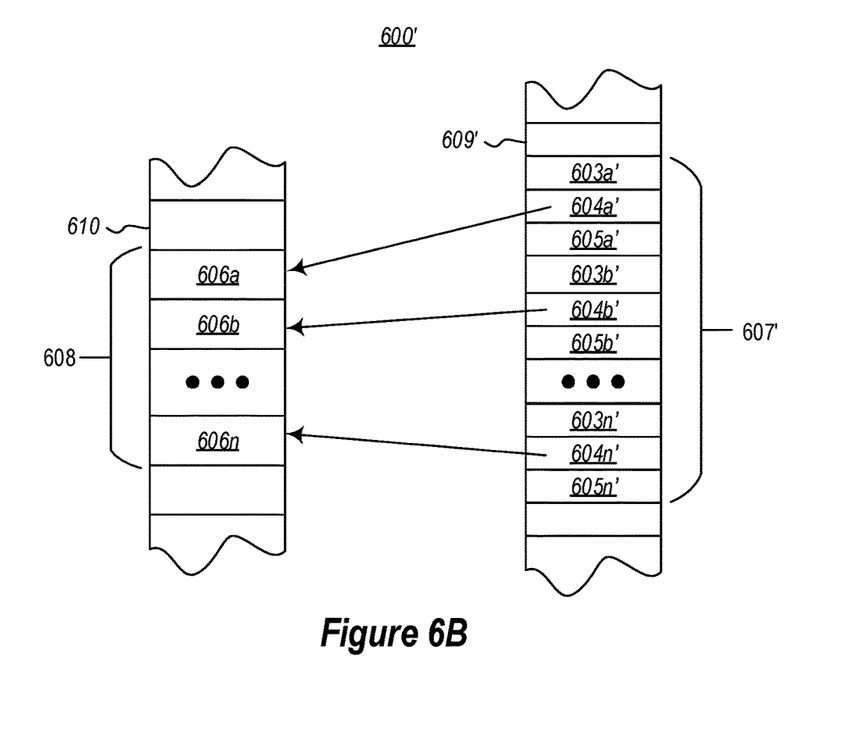
FIG. 6B illustrates an example memory layout corresponding to the linked list of FIG. 4B.

Similarly, FIG. 6B illustrates an example memory layout 600' corresponding to the linked list 400' of FIG. 4B. FIG. 6B illustrates two memory portions 609' and 610. Memory portion 609' corresponds generally to memory portion 609 in layout 600 of FIG. 6A, and it includes a first range of memory addresses 607' corresponding to memory locations 603' (i.e., locations 603a', 603b', and so on to 603c'), 604' (i.e., locations 604a', 604b', and so on to 604c'), and 605' (i.e., locations 605a', 605b', and so on to 605c') which, in turn correspond to the nodes of linked list 400'. The first range of memory addresses 607' generally represents an outer data structure (linked list) that contains references to inner data structures 406. Memory portion 609' could be determined, for example, based on knowledge of the head of the linked list, based on knowledge of a size of the node entry data 404', and based on knowledge of the structure of each node.

Memory portion 610 memory contains the memory locations (606a-606n, referred to generically as memory locations 606) that each store one of the inner data structures 406 of linked list 400'. Thus, as depicted, memory portion 610 includes a second range of memory addresses 608. After determining this memory layout 600', the memory address identification component 204 can store the identified ranges of memory addresses (607' and 608) in the watch list 202a, so that a breakpoint occurs whenever any of these locations are accessed. Again, it will be appreciated that the memory portions 610 and 609' could include contiguous and/or noncontiguous memory locations.

Returning to FIG. 2, the memory address identification component 204 includes a conceptual component 204a and a physical component 204b. These components operate to determine which memory addresses are added to the watch list 202a, based on a type of view—conceptual or physical—of a data structure that is to be presented at the debugger 106. This could be based on user preference, performance considerations, and/or resource utilization considerations.

In general, a conceptual view of a data structure is a view of the data stored in the data structure, while a physical view also exposes the underlying structure/layout of the data structure. Thus, for example, to produce a conceptual view of linked list 400', conceptual component 204a may add only those memory identified locations to the watch list 202a that would cause breakpoints when node entry data 404' or inner data structures 406 are accessed (e.g., memory locations 604' and 608 of in FIG. 6B), while leaving any remaining locations in memory locations 603' and 605' off the watch list 202a—even if they have been identified as being covered by linked list 400. In contrast, to produce a physical view, the conceptual component 204a may add all of the locations in memory locations 608 and 607' to the watch list 202a. Thus, with a conceptual view, breakpoints on linked list 400' would occur when changes occur to data that the user and/or the software that is being debugged cares about. A physical view, on the other hand, would also cause breakpoints on linked list 400' to occur when structural changes to linked list 400' occur (e.g., modification or addition of pointers 403 and 405).

It will be appreciated that for general debugging, a conceptual view may be desirable because it results in breakpoints on data structures only at points in which data that could affect decision making by the software that is being debugged. A physical view, however, may be desirable for more detailed debugging to track down bugs in code implementing data structures themselves, race conditions, etc. Note that a data structure's physical view could change even if the software being debugged makes no changes or accesses to it. For example, a managed environment may copy a data structure to one area of memory to another to facilitate caching, garbage collection, etc. In these circumstances, the physical view would change (i.e., the memory locations of stored data and/or the values of pointers would need to change), while the conceptual view would stay the same. Some embodiments may further focus on the physical view—to break only when the physical structure of the subject data structure has changed—by placing only memory locations relating to structure on the watch list 202a, while leaving memory locations relating to stored data off the watch list 202a.

The change detection component 205 operates to detect changes to data structures for which breakpoints are set. For example, if entries are added, relocated, or removed from array 300, or nodes are added, moved, or removed from linked list 400, the change detection component 205 can detect this change and cause the memory locations in the watch list 202 for that data structure to be updated appropriately. The change detection component 205 could make these changes incrementally (e.g., modifying only these memory locations that have been added or removed), or it could remove all memory locations relating to the data structure from the watch 202a and perform a full analysis of the data structure again (i.e. using the data structure identification component 203 and the memory address identification component 204).

The user interface component 206 has already been referred to in reference to earlier components. However, in general, the user interface component 206 operates to present data at a user interface and facilitate receipt of user input. Example types of input can be the identity of a data structure for which breakpoints are desired, additional data describing the data structure, custom functions for describing the layout of the data structure, etc.

Figure 7:
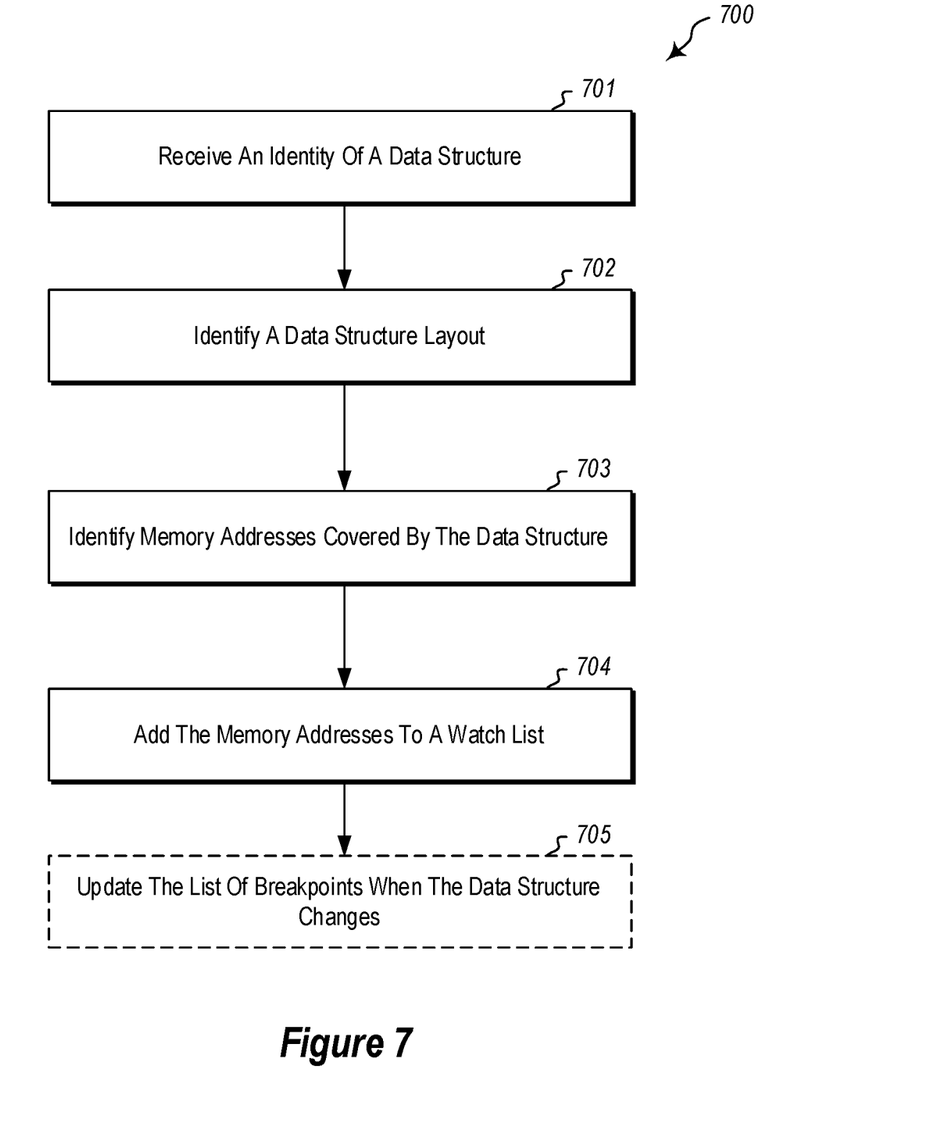
FIG. 7 illustrates a flow chart of an example method for setting breakpoints on a plurality of memory addresses covered by a data structure.

In view of the foregoing, FIG. 7 illustrates a flowchart of an example method 700 for setting breakpoints on a plurality of memory addresses covered by a data structure. Method 700 is described in view of FIGS. 1-6B. While method 700 is presented as a series of acts, it will be appreciated that the particular number and ordering of the acts shown is only example of setting breakpoints on a plurality of memory addresses covered by a data structure.

As depicted, method 700 includes an act 701 of receiving an identity of a data structure. Act 701 can comprise receiving a reference to a data structure for which breakpoints are requested. For example, the user interface component 206, in conjunction with input hardware such as keyboard/mouse 105a, can receive the identity of a data structure for which breakpoints are requested. This reference could be by data structure name, memory address, etc.

Method 700 also includes an act 702 of identifying a data structure layout. Act 702 can comprise, based on receiving the reference to the data structure, identifying a data structure layout of the data structure. For example, the data structure identification component 203 can identify a type and layout of the data structure identified in act 701. This may include, for example, recognizing the data structure as being a structure natively supported by the programming language used (i.e., using native component 203a), recognizing the data structure from a library (i.e., using library component 203b), and/or recognizing the data structure based on a custom user-defined function (i.e., using custom function component 203c). Additionally, act 702 could include recognizing that the data structure is an outer data structure that includes inner data structures, either directly or by reference (i.e., using composability component 203d). The data structure identification component 203 can then identify the structure of each of these outer and inner data structures, and compose the outer and inner data structures together to obtain an overall data structure layout.

Method 700 also includes an act 703 of identifying memory addresses covered by the data structure. Act 703 can comprise, based on the data structure layout of the data structure, identifying a plurality of memory addresses that are covered by the data structure. For example, the memory address identification component 204 can identify which memory addresses are covered by the data structure, based on the structural knowledge gained by the data structure identification component 203. Depending on circumstance (e.g., user preference, performance concerns, etc.) the memory address identification component 204 may identify memory addresses associated with a conceptual view of the data structure (i.e., conceptual component 204a), and/or memory addresses associated with a physical view of the data structure (i.e., physical component 204b).

Method 700 also includes an act 704 of adding the memory address to a watch list. Act 704 can comprise adding the plurality of memory addresses to a list of breakpoints. For example, the memory address identification component 204 can add the memory addresses identified in act 703 to watch list 202a, so that the breakpoint component 202 performs breakpoint checks based on these addresses.

In some embodiments, method 700 may include an act 705 of updating the list of breakpoints when the data structure changes. Act 705 can comprise detecting at least one change in the plurality of memory addresses that are covered by the data structure, and updating the plurality of memory addresses in the list of breakpoints to reflect the at least one change. For example, as the identified data structure changes (e.g., due the addition, modification, or removal of data elements, due to activity by a runtime environment, etc.), the change detection component 205 can detect that these changes have occurred, and cause the watch list 202a to be updated as appropriate (either through a differential change in the memory addresses stored in 202a, or through a new analysis of the data structure with the data structure identification component 203 and the memory address identification component 204).

Accordingly, the embodiments herein expand breakpoint functionality to add breakpoints to a plurality of memory addresses covered by the data structure (i.e., up to the entire data structure), rather than merely to the base memory address of the data structure. Thus, embodiments can enable a debugger to suspend code execution when any memory address associated with a data structure is accessed during execution. This can greatly reduce the amount of time that it takes to debug an application, and thereby free up computing resources for other tasks.

As mentioned, enabling breakpoints on an entire data structure may involve using a watch list 202a storing a great number (e.g., many thousands, or more) of memory addresses that far exceeds the available hardware-assisted mechanisms (e.g., special processor registers). Furthermore, using conventional software-based mechanisms (i.e., code instrumentation), checking for each breakpoint in software is very expensive (i.e., in terms of processor cycles), and these expensive checks need to be performed for every memory access operation.

Thus, some embodiments utilize a new and efficient mechanism for handling breakpoints. This mechanism uses a cache, rather than code instrumentation, to facilitate breakpoint checks. In particular, this mechanism enables breakpoint checks to be performed only when a cache miss occurs, rather than when each memory access operation occurs—which greatly reduces the occurrence of breakpoint checks and greatly improves performance when detecting breakpoints.

Figure 8:
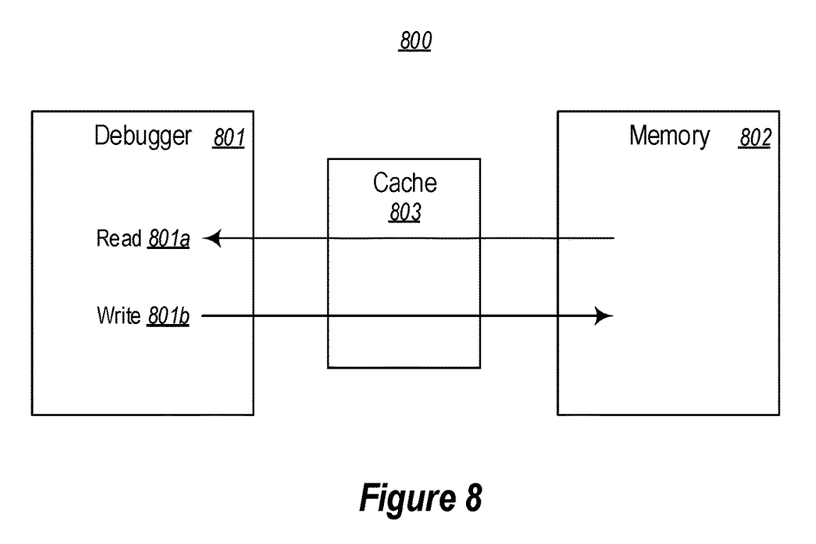
FIG. 8 illustrates an example environment for watching for breakpoints using a cache.

To illustrate this concept, FIG. 8 depicts an example environment 800 for watching for breakpoints using a cache. In FIG. 8, a debugger 801 (e.g., debugger 106 of FIG. 2) performs memory reads 801a and writes 801b to memory 802 through a cache 803. However, rather than using the cache 803 in a conventional manner, the debugger 801 operates to ensure that any cache line(s) corresponding to memory address(es) that are being monitored (e.g., addresses in watch list 202a) are evicted from the cache 803.

For example, when memory address(es) are added to watch list 202a (e.g., by the memory address identification component 204), the debugger 108 checks if there already exists any cache line(s) in the cache 803 that overlap with these memory address(es); if so they are evicted from the cache 803. Then, when a cache miss occurs based on access to any memory address, the debugger 801 (e.g., breakpoint component 202) determines if a breakpoint check is needed. In particular, the debugger 801 compares the cache line that was imported into the cache based on the cache miss memory addresses in the watch list 202a to determine if there are any overlapping memory address(es).

If there is no overlapping memory address, then a breakpoint could not have occurred, and so the cache miss is honored normally (e.g., it is permitted to remain in the cache 803). If there is an overlap, however, a breakpoint could have occurred so a breakpoint check is performed to determine if a breakpoint was actually encountered. For example, the debugger 801 can determine if the portion of the cache line corresponding with the overlapping memory address was actually accessed (i.e., a breakpoint has occurred), or if only some other portion of the cache line was accessed (i.e., a breakpoint did not occur). Additionally, if there was an overlapping address, the cache line is evicted from the cache 803 so that another cache miss will occur—and with it another breakpoint check will be performed—if the memory address is accessed again later. In this way, breakpoint checks only need to be performed for some memory access operations that cause a cache miss to occur, rather than with each memory access operation.

Accordingly, the breakpoint checking embodiments described in connection with FIG. 8 can provide an efficient mechanism for watching for a large number of memory addresses. However, this is one mechanism only, and none of the embodiments herein are limited to use of these mechanisms.

Although the subject matter has been described in language specific to structural features and/or methodological acts, it is to be understood that the subject matter defined in the appended claims is not necessarily limited to the features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
   one or more processors; and
   one or more computer-readable media having stored thereon computer-executable instructions that are executable by the one or more processors to cause the computer system to set breakpoints on a plurality of memory addresses covered by a data structure, the computer-executable instructions including instructions that are executable to cause the computer system to perform at least the following:
   receive a reference to a data structure for which breakpoints are requested;
   based on receiving the reference to the data structure, identify a data structure layout of the data structure;
   based on the data structure layout of the data structure, identify a plurality of memory addresses that are covered by the data structure; and
   add the plurality of memory addresses to a list of breakpoints.

2. The computer system of claim 1, wherein identifying the data structure layout of the data structure comprises identifying a data structure type from among at least one of (i) data structures natively provided by a programming language, or (ii) data structures described by a library or a data structure description framework.

3. The computer system of claim 1, wherein identifying the data structure layout of the data structure comprises identifying a custom function that describes the data structure.

4. The computer system of claim 1, wherein identifying the data structure layout of the data structure comprises use of compiler symbols.

5. The computer system of claim 1, wherein identifying the plurality of memory addresses that are covered by the data structure comprises identifying memory addresses corresponding to a conceptual view of the data structure.

6. The computer system of claim 1, wherein identifying the plurality of memory addresses that are covered by the data structure comprises identifying memory addresses corresponding to a physical view of the data structure.

7. The computer system of claim 1, wherein identifying the plurality of memory addresses that are covered by the data structure comprises composing the data structure with one or more inner data structures.

8. The computer system of claim 7, wherein composing the data structure with one or more inner data structures comprises following at least one level of links to obtain the one or more inner data structures.

9. The computer system of claim 1, the computer-executable instructions also including instructions that are executable to cause the computer system to:
   detect at least one change in the plurality of memory addresses that are covered by the data structure; and
   update the plurality of memory addresses in the list of breakpoints to reflect the at least one change.

10. The computer system of claim 1, wherein the identity of the data structure comprises a base memory address of the data structure.

11. A method, implemented at a computer system that includes one or more processors, for setting breakpoints on a plurality of memory addresses covered by a data structure, the method comprising:
    receiving a reference to a data structure for which breakpoints are requested;
    based on receiving the reference to the data structure, identifying a data structure layout of the data structure;
    based on the data structure layout of the data structure, identifying a plurality of memory addresses that are covered by the data structure; and
    adding the plurality of memory addresses to a list of breakpoints.

12. The method of claim 11, wherein identifying the data structure layout of the data structure comprises identifying a data structure type from among at least one of (i) data structures natively provided by a programming language, or (ii) data structures described by a library or a data structure description framework.

13. The method of claim 11, wherein identifying the data structure layout of the data structure comprises identifying a custom function that describes the data structure.

14. The method of claim 11, wherein identifying the data structure layout of the data structure comprises use of complier symbols.

15. The method of claim 11, wherein identifying the plurality of memory addresses that are covered by the data structure comprises identifying memory addresses corresponding to a conceptual view of the data structure.

16. The method of claim 11, wherein identifying the plurality of memory addresses that are covered by the data structure comprises identifying memory addresses corresponding to a physical view of the data structure.

17. The method of claim 11, wherein identifying the plurality of memory addresses that are covered by the data structure comprises composing the data structure with one or more inner data structures.

18. The method of claim 17, wherein composing the data structure with one or more inner data structures comprises following at least one level of links to obtain the one or more inner data structures.

19. The method of claim 11, further comprising:
detecting at least one change in the plurality of memory addresses that are covered by the data structure; and
updating the plurality of memory addresses in the list of breakpoints to reflect the at least one change.

20. A computer program product comprising one or more hardware storage devices having stored thereon computer-executable instructions that are executable by one or more processors to cause a computer system to set breakpoints on a plurality of memory addresses covered by a data structure, the computer-executable instructions including instructions that are executable to cause the computer system to perform at least the following:
receive a reference to a data structure for which breakpoints are requested;
based on receiving the reference to the data structure, identify a data structure layout of the data structure;
based on the data structure layout of the data structure, identify a plurality of memory addresses that are covered by the data structure; and
add the plurality of memory addresses to a list of breakpoints.

\* \* \* \* \*